United States Patent
Kiest, Jr.

(10) Patent No.: US 7,896,032 B2
(45) Date of Patent: Mar. 1, 2011

(54) METHOD AND DEVICE FOR LINING PIPE (75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 1152 days.

(21) Appl. No.: 11/536,010

(22) Filed: Sep. 28, 2006

(65) Prior Publication Data

US 2008/0078463 A1    Apr. 3, 2008

(51) Int. Cl.
*F16L 55/16* (2006.01)
(52) U.S. Cl. ........ 138/98; 138/97; 405/150.1; 405/184.2
(58) Field of Classification Search .............. 138/97, 138/98; 405/150.1, 184.2
See application file for complete search history.

(56) References Cited

U.S. PATENT DOCUMENTS

| | | | |
|---|---|---|---|
| 3,228,096 A * | 1/1966 | Albro | 29/890.15 |
| 4,602,659 A * | 7/1986 | Parkyn, Sr. | 138/98 |
| 5,322,653 A * | 6/1994 | Muller | 264/35 |
| 5,351,720 A | 10/1994 | Maimets | |
| 5,501,248 A | 3/1996 | Kiest, Jr. | |
| 5,628,345 A * | 5/1997 | Fisco | 138/98 |
| 5,765,597 A | 6/1998 | Kiest, Jr. et al. | |
| 5,794,663 A | 8/1998 | Kiest, Jr. et al. | |
| 5,816,293 A | 10/1998 | Kiest, Jr. | |
| 5,855,729 A | 1/1999 | Kiest, Jr. et al. | |
| 5,950,682 A | 9/1999 | Kiest, Jr. | |
| 5,964,249 A | 10/1999 | Kiest, Jr. | |
| 6,019,136 A * | 2/2000 | Walsh et al. | 138/98 |
| 6,021,815 A | 2/2000 | Kiest, Jr. et al. | |
| 6,039,079 A | 3/2000 | Kiest, Jr. | |
| 6,105,619 A | 8/2000 | Kiest, Jr. | |
| 6,123,109 A * | 9/2000 | Kamiyama et al. | 138/98 |
| 6,138,718 A | 10/2000 | Maimets | |
| 6,199,591 B1 | 3/2001 | Kiest, Jr. et al. | |
| 6,206,993 B1 | 3/2001 | Kiest, Jr. et al. | |
| 6,482,280 B1 | 11/2002 | Kiest, Jr. et al. | |
| 7,216,674 B2 * | 5/2007 | Manners | 138/98 |
| 7,311,121 B2 | 12/2007 | Kamiyama et al. | |
| 2008/0029177 A1 | 2/2008 | Kamiyama et al. | |

FOREIGN PATENT DOCUMENTS

| | | |
|---|---|---|
| DE | 92 02 277 U1 | 6/1992 |
| GB | 2 226 615 A | 7/1990 |

* cited by examiner

*Primary Examiner* — James F Hook
(74) *Attorney, Agent, or Firm* — McKee, Voorshees & Sease, P.L.C.

(57) ABSTRACT

The present invention is a new liner assembly for use in pipes constructed from a flexible liner formed from a resin absorbent material. A compressible material, such as stitch-bond or foam, is attached to one or more sides of the liner for forming a taper along the compressible material when the liner is cured in place in the pipe using a curable resin and an expandable bladder to shape the liner to match the inside shape of the pipe. A taper is formed along the compressible material from the inside of the liner down to the inside of the pipe in which the liner is placed. As a result, a taper prevents accumulation of solid materials at the location of the pipe repair and thus prevents future clogging of the pipe at the repair.

35 Claims, 9 Drawing Sheets

METHOD AND DEVICE FOR LINING PIPE

BACKGROUND OF THE INVENTION

The present invention relates to pipe repair. Specifically, the present invention relates to a new method and device for lining pipe.

A system which is commonly used for repairing damaged sewer pipes is called cured-in-place pipe repair. Cured-in-place pipe repair is typically a fabric felt-type liner, impregnated with a liquid resin, formed inside an existing conduit or pipe and cured or hardened to become a one-piece continuous new pipe lining. The liner is pressed outward against the pipe using an expandable bladder. The resin cures, forming the liner tightly along the inside of the pipe in the damaged area, thereby creating a water tight seal and repairing the pipe.

Cured-in-place technology is used to renew main sewer pipes, lateral sewer pipes as well as other types of conduits. When using cured-in-place pipe repair for renewing both main and lateral pipes, the lining is generally either pulled in place and inflated or inverted into place and inflated. One problem, however, with this type of pipe repair is that the edges of the liner create ridges inside the pipe where solids can collect and create blockage inside the pipe. This is particularly problematic on the edge at the upstream end of the liner.

In general, when a section of cured-in-place pipe, whether straight, curved, or pipe junction, is placed in a sewer pipe, the edge of the liner is raised by the thickness of the liner and thus creates an area for buildup of solids, thereby blocking the pipe. Thus, it is desirable to have an improvement in cure-in-place pipe liners.

When these liners are pulled into place or inverted into place the liner is generally attached to the bladder in some manner to get the liner into proper position inside the damaged pipe. Then, once the resin cures, the bladder is removed. However, to remove the bladder, the connection between the bladder and the liner must be frangible. Therefore, connections between the bladder and the liner have used connecting strips stitched to the bladder and held to the liner with an adhesive or other means which can be broken. Stitching the fabric liner directly to the bladder puts unwanted holes in the liner which may leak at the damaged portion of the pipe once the stitches are removed or broken and dissolved. Another problem with these and other known frangible connections between the bladder and the liner is that the frangible connection is difficult to break once the liner resin cures in place inside the pipe. Therefore an improved frangible connection between the bladder and the liner is desirable.

In light of the foregoing, the primary feature and advantage of the present invention is to provide an improved new method and device for lining pipe.

A further feature or advantage of the present invention is a device for lining pipe which reduces solids accumulation and thus reduces chance for blockage of pipe repairs.

A further feature or advantage of the present invention is a method of lining pipe which reduces blockage in the pipe being repaired.

Another feature or advantage of the present invention is a method of frangibly connecting a liner tube to an elongated positioning tube or an inversion bladder where the frangible attachment is strong during placement of the liner, yet can be easily broken or separated during removal of the positioning tube or bladder once the liner resin has cured.

Yet another feature or advantage of the present invention is a device for frangibly connecting a pipe repair liner to an expansion bladder which is strong during placement of the liner yet can be easily broken or disconnected during removal of the positioning hose or bladder once the liner resin has cured.

A further feature or advantage of the present invention is a device for lining pipe which is economical to manufacture, durable in use and efficient in operation.

One or more of these and/or other features or advantages of the present invention will be apparent from the specification and claims that follow.

BRIEF SUMMARY OF THE INVENTION

The present invention is an improved method and device for lining pipe where a resin impregnated material is placed inside a pipe and expanded using an inflated bladder wherein the resin is allowed to cure. At least a portion of an end of the liner has a transition collar forming a taper from the inside surface of the pipe to the inside surface of the liner when the liner is cured in place in the pipe to allow solids to pass over the taper thus reducing chances of accumulation of solids in the repaired pipe.

The transition collar is preferably more compressible than the liner. In addition, the transition collar preferably has a coating which can be frangibly connected to the expandable bladder and peeled away from the collar once the liner and collar is cured in place, allowing easy removal of the bladder after curing of the resin.

DETAILED DESCRIPTION OF THE PREFERRED EMBODIMENT

Figure 1:
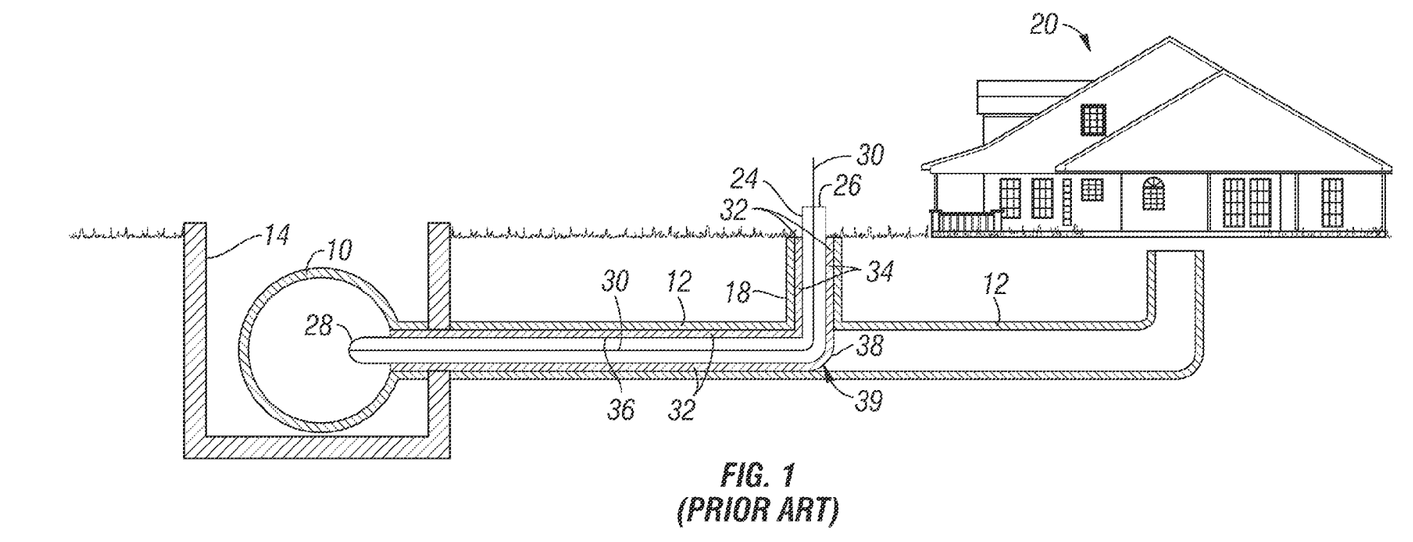
FIG. 1 is a pictorial prior art cut away view representation illustrating a cleanout pipe where a cured in-place liner closes off service from the house.
Figure 2:
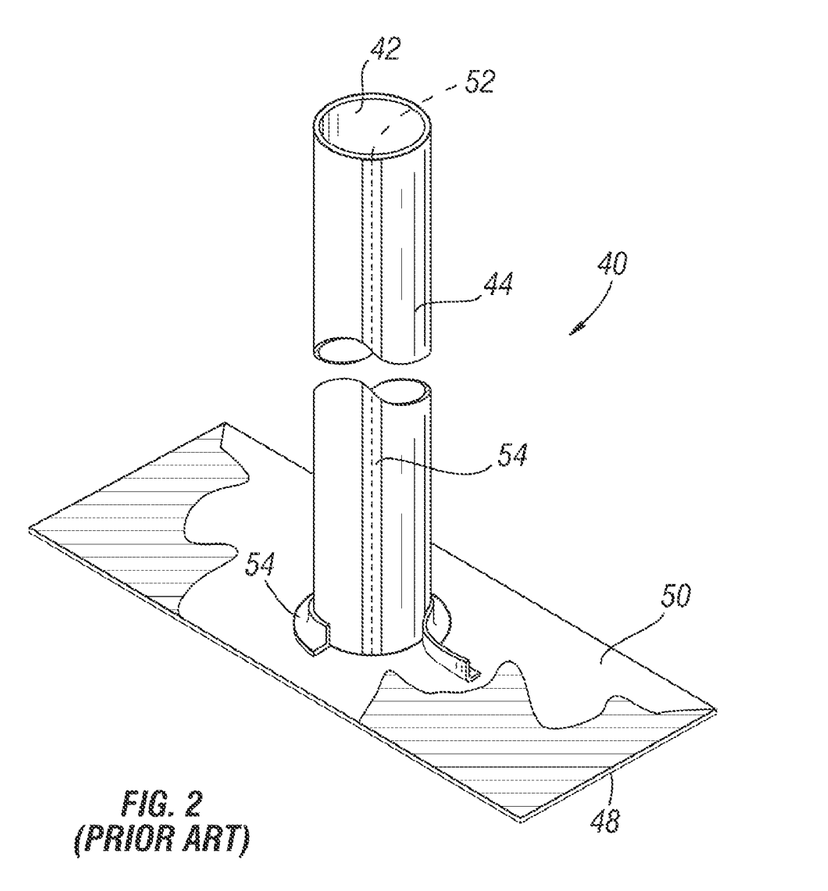
FIG. 2 is an isometric view of a prior art liner assembly capable of being used at a pipe junction between two sewer lines.
Figure 3:
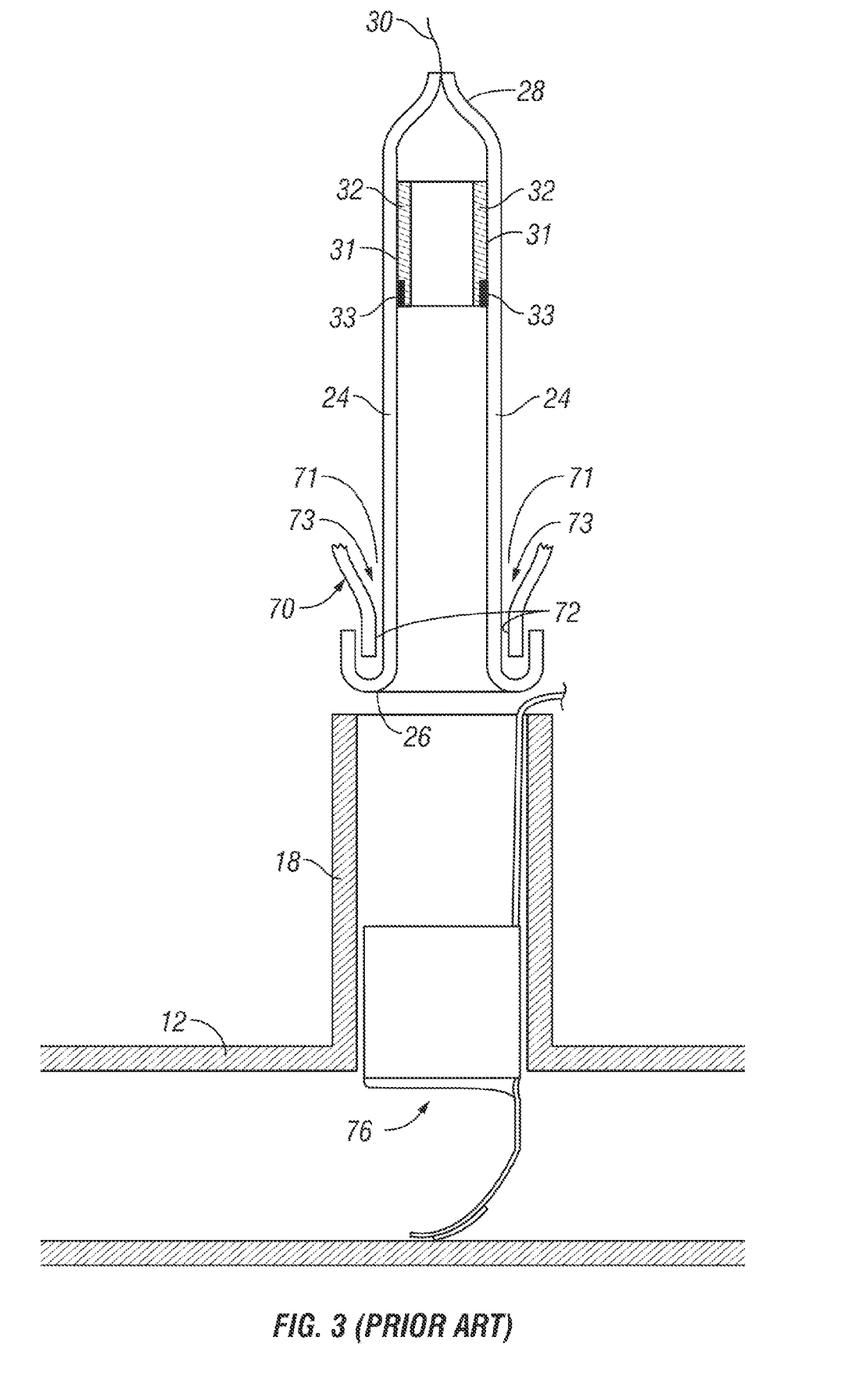
FIG. 3 is a prior art cutaway view of a partial liner before being inverted into a sewer line.
Figure 4:
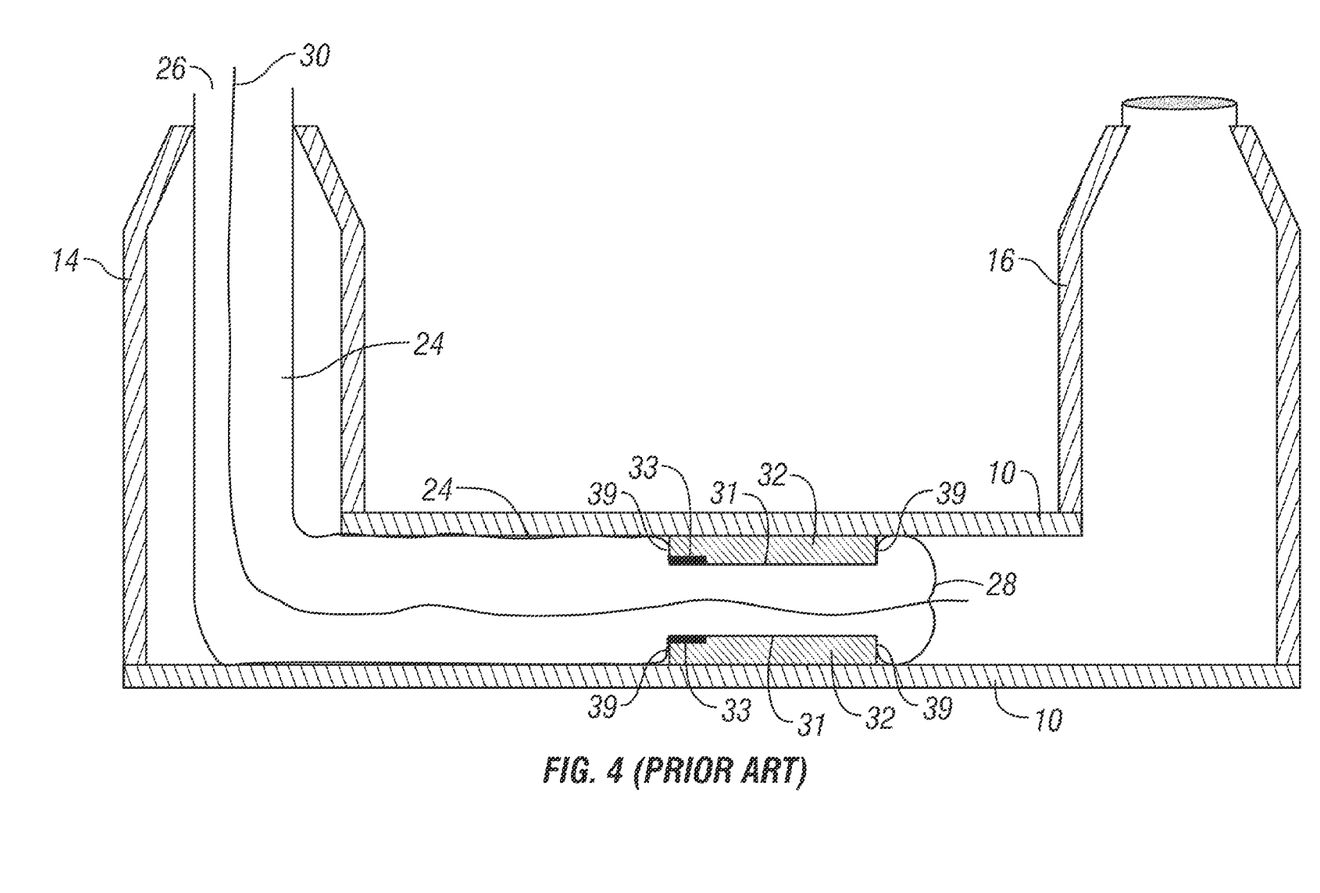
FIG. 4 is a prior art cutaway view of a liner inserted into a main sewer line after inversion.
Figure 5:
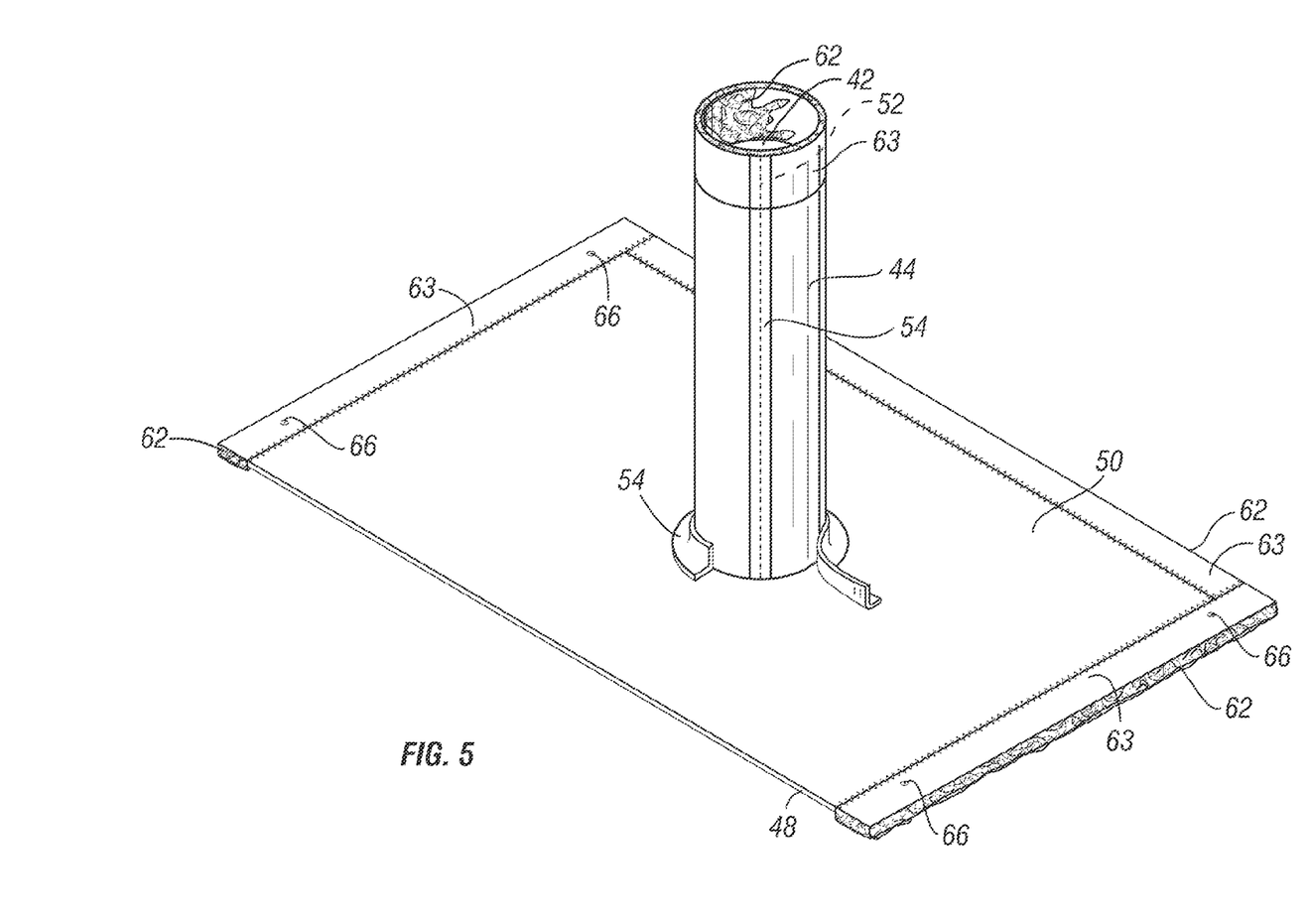
FIG. 5 is an isometric view of one embodiment of a sheet pipe junction liner assembly incorporating the present invention for lining pipe.

Typical prior art pipe repairs are shown in FIGS. 1-4. FIG. 1 shows a continuous liner tube 32 from the insertion point of the access or cleanout pipe 18 through the lateral pipe 12 to the main sewer pipe 10. FIG. 2 shows a liner assembly used for repairing pipe junctions such as at a main sewer line 10/lateral sewer line 12 junction or at a lateral sewer line 12/cleanout 18 junction. FIG. 3 shows one method for inserting a tube liner 32 into a partial section of lateral line 12 using an air pressure driven inversion process. Other types of positioning devices (not shown) can also be used to locate the liner 30 inside the pipe 10, 12 as would readily be understood by those skilled in the art. FIG. 4 shows a tube liner 32 curing in place to repair a partial section of a lateral line 12.

The liner 32 may or may not have an outer polymer-type coating 31. If the liner 32 has an outer coating 31 and the liner 32 is pulled into place, the resin impregnated into the lining 32 will remain contained within the coated tube, preventing resin from migrating into pipe brakes and open joints. If the lining 32 does not have an outer coating 31 and the liner 32 is pulled into place, the resin impregnated into the lining 32 may be contaminated and even wiped off during the pulling-in process. Thus, the inversion procedure is generally preferred for eliminating these issues.

In FIG. 1, a main sewer line 10 is connected to a lateral sewer line 12 inside manhole 14. Generally, an access pipe/cleanout 18 allows access to the lateral sewer line 12 and the main sewer line 10 without having to dig up the earth or compromise the sewer lines 10, 12. The lateral sewer line 12 extends to a house 20 giving access to the main sewer line from the house 20.

Figure 11:
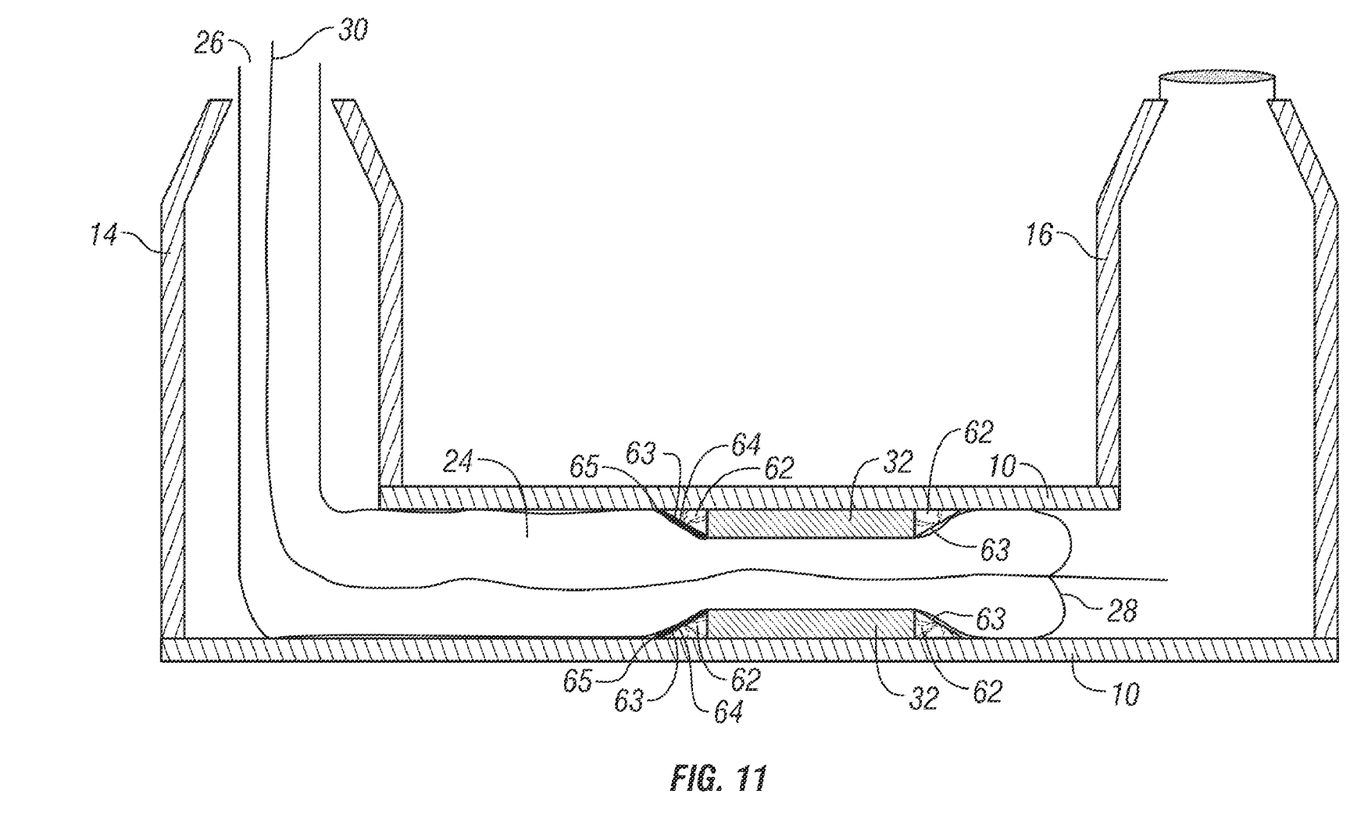
FIG. 11 is a cutaway view of one embodiment of the present invention inverted into a main sewer line.

A pulled-in place liner requires two access points. One access point is a manhole 14, which is commonly located in public streets. The other access point may be another manhole 16, as shown in FIGS. 4 and 11, or it can also be a clean-out pipe 18. Then, the liner 32 is pulled from one access point toward the second access point using a rope or other means until the liner is properly positioned in the damaged pipe.

The inversion method requires only one access point. It is generally considered a superior method for inverting a liner 32, allowing the liner 32 to be inserted into the pipe from only one access point, and allowing resin to contact the pipe directly and migrate into broken areas of the pipe without damaging the liner. However, inverting a full continuous liner 32 through a clean-out pipe 18 and into the lateral line 12 creates an upstream side which blocks off service from the house 20 through the main sewer line 10, as shown in FIG. 1. This is because the liner is within both the clean-out pipe 18 and the lateral pipe 12, blocking out the lateral pipe 12 at 38. Therefore, the lining 32 will need to be cut out at 38 after the resin is cured to reinstate service to the house 20. This type of reinstating process requires expensive equipment, additional time, and if the cut is not smooth, solids will build up on a ridge at 39 created by the lining, causing backups within the pipe.

The repair in FIG. 1 shows a prior art bladder/liner assembly having a bladder tube 24, an open end or upper end of the bladder tube 26, and a closed end or lower end of the bladder tube 28. A pull line 30 is attached to the closed end 28 of the bladder tube 24 for use in removing the bladder tube 24 once the resin has cured. FIG. 3 shows that a liner tube 32 is inserted into a bladder tube 24 before inversion. Also, the liner tube 32 may have a polymer or other type of coating 31. The liner tube 32 is then positioned on the exterior of the bladder tube 24 after inversion. As can be seen from the figure, the liner tube 32 includes an access portion 34 of the liner tube 32 within the access pipe 18 and a lateral portion 36 of the liner tube 32 within the lateral line pipe 12.

Another prior art liner assembly 40 is shown in FIG. 2. This type of liner assembly 40 is used at T-type junctions to repair the junction or the pipe near the junction. The liner assembly 40 includes a tubular lateral liner 42 connected to a flat sheet liner 48 that rolls around onto itself forming a tube prior to installation. Both liners 42 and 48 are generally formed of felt or other resin absorbent material. Lateral liner 42 is formed by connected side edges of a sheet of liner material with a polymer coating 44 on one side, such that the polymer coating 44 is on the exterior of the tube being formed. The edges of the sheet are sewn together at a seam 52, and a strip of polymer tape 54 is welded over the seams 52 to form an airtight and water tight seal.

The flat sheet liner 48 has a central opening formed therein, and has a polymer coating 50 on the top surface thereof. The lateral liner tube 42 is preferably sewn to the flat sheet liner 48 around the opening, and a strip of polymer tape 54 is then welded continuously around the juncture to form an airtight and water tight seal.

Once liner assembly 40 has been completed, the liner 40 is moved into place in the sewer line 10, 12, 18 by any method which works to properly locate the liner assembly 40 inside the pipe junction.

A quantity of curable liquid resin is introduced onto the liner assembly 40 and covers the liner assembly 40 and completely impregnates the liner assembly 40. A bladder tube similar to that shown as 24 in other figures is inserted into the liner assembly 40 and expanded while the resin is allowed to cure. Thus, the liner assembly 40 takes the shape of the pipe 10, 12, 18 to fix or cover the junction or any damaged areas. However, as mentioned above, the edges on the liner assembly 40 can create ridges inside the pipe, shown at 39 in FIGS. 1 and 4, thereby causing a blockage or an area for solids to gather and create a blockage in the pipe 10, 12, 18.

FIGS. 3 and 4 show prior art examples of inverting a liner tube 32 into a pipe 10, 12, 18. One having ordinary skill in the art would understand how the inversion process works to insert a liner tube 32 into a pipe 10, 12, 18. An external launcher 70 (shown as partial) is utilized outside the access pipe/clean out 18. The external launcher 70 has a launcher chamber 71 and a launcher opening 72. Air pressure, shown as arrows 73, is injected into the launcher chamber 71 for causing an inversion of the bladder tube 24 and the liner tube 32. A guide tool assembly 76 may be used to help direct the bladder tube 24 and the liner tube 32 to travel in the proper direction.

Using the inversion method of insertion of the liner, preferably the liner has a thin coating 31 on the outside of the liner 32, 40 which contacts the inside of the bladder tube 24 when the liner 32, 40 is located inside the bladder tube 24 for inversion. FIGS. 3 and 4 show that the liner tube may be frangibly attached at 33 to the bladder tube 24 to allow the liner tube 32 to travel with the bladder tube 24 to the desired location. The frangible attachment or connection 33 may be frangibly connected to a bladder 24 by stitches, a solvent weld, or other method. A disadvantage to stitches is the connection points are at various specific points around the circumference of the liner 32 which does not provide uniform pull on the beginning of the liner. Further, the stitches are the same strength during inversion as they are when the bladder 24 is removed. This is because the liner 32 is not actually stitched to the bladder 24 because the bladder 24 cannot be punctured from stitches. Therefore, the bladder 24 has either a connecting collar (not shown) or connecting strips (not shown) attached at the beginning of the liner 32.

The inversion process inverts the bladder 24 and the liner 32, 40 inside the pipe 10, 12, 18. Thus, the outside or the polymer coating 31, 44, 50 before the inversion becomes the inside of the liner 32, 40 after inversion. This is best shown in FIGS. 3 and 4. The bladder 24 is inflated so the liner 32, 40 is pressed against the inside of the pipe 10, 12, 18 during curing of the resin. The pull line 30 is then pulled after the resin cures to break the frangible connection 33 and remove the bladder 24. However, as seen at 39 in FIG. 4, ridges are formed by the thickness of the bladder 32, 40.

FIGS. 5-9 show one embodiment of the new liner assembly 60 of the present invention for use in pipe junctions in pipes. The liner assembly 60 is constructed from a flat sheet liner 48. The liner assembly 60 may have a tubular lateral liner 42 attached to an opening in the flat sheet liner 48 for allowing the liner assembly 60 to be used where a lateral sewer line 12 connects with a main sewer line 10 or where a cleanout 18 connects with a lateral sewer liner 12. Preferably the lateral liner 42 has a thin polymer coating 44 and the flat sheet liner 48 has a thin polymer coating 50. The liner assembly 60 may be formed without a tubular lateral liner 42 from a flat sheet liner 48 for repairing straight pipes. In other words, the present invention can be incorporated with an end of a lateral lining 42 that is connected to an opening in a flat sheet liner 48 for repairing pipe junctions, or the flat sheet liner 48 can be wrapped around itself forming a tube without a lateral liner 42 for repairing straight pipe. Also, as described below, a continuous liner tube 32 can be formed as a tube for repairing pipes.

Attached to any tubular lateral liner 42 and/or one or more edges of the flat sheet liner 48 is a transition collar made from a compressible material 62. The compressible material 62 is stitched or otherwise securely held to the tubular lateral liner 42 and/or the flat sheet liner 48. The compressible material 62 can be constructed from stitch-bond material, foam, or any other easily compressible material capable of being impregnated with a resin. Preferably the compressible material 62 has a thin polymer coating 63. The transition collar extends away from at least a portion of the liner 32, 42, 48 to provide a taper 64 from the inside surface of the pipe to the inside surface of the liner 32, 42, 48 when the resin cures the liner in place. With the taper 64, instead of a ridge 39, solids are less likely to accumulate inside the pipe at the repair.

Figure 6:
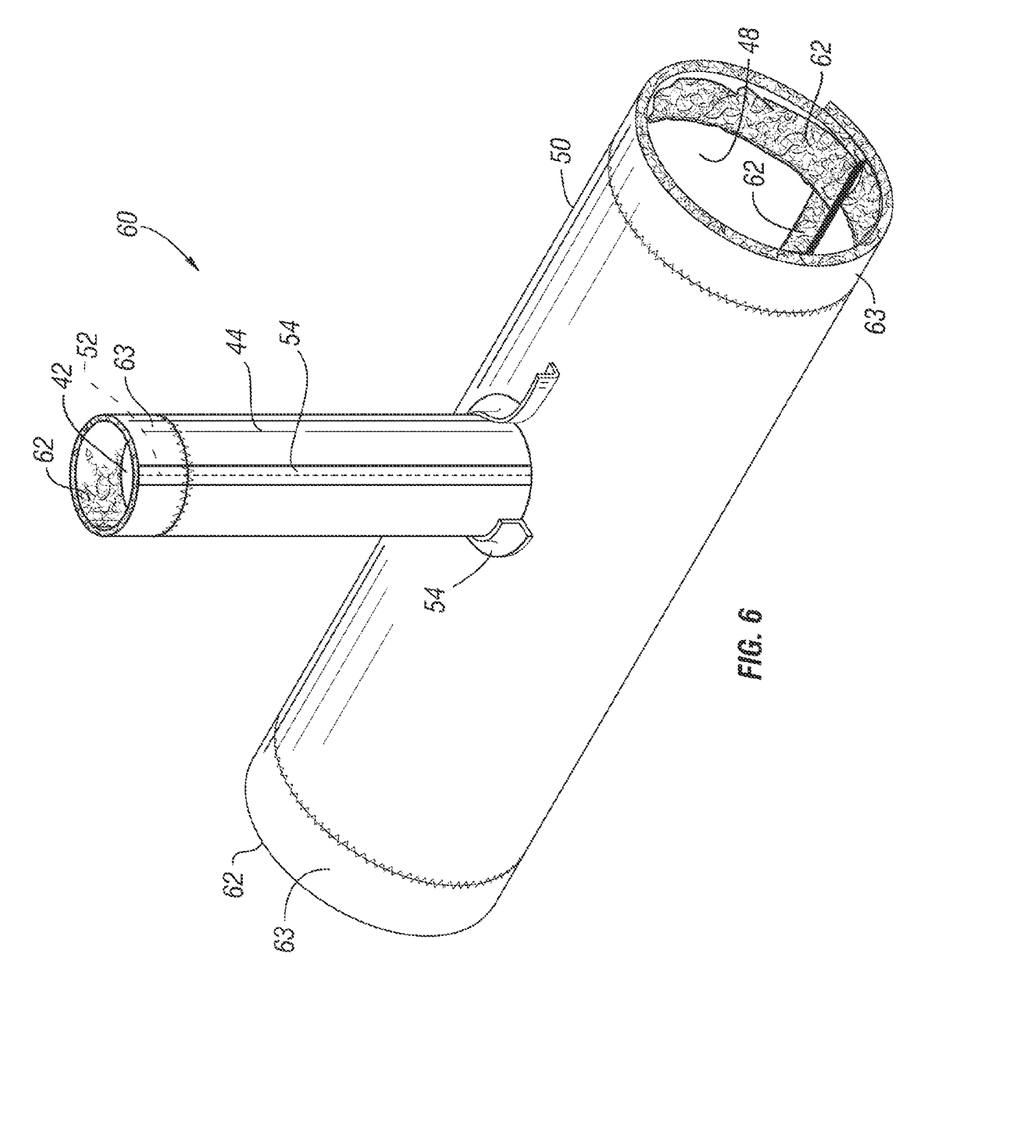
FIG. 6 is a view of the liner device of FIG. 5 where the sheet liner forms a tube.
Figure 7:
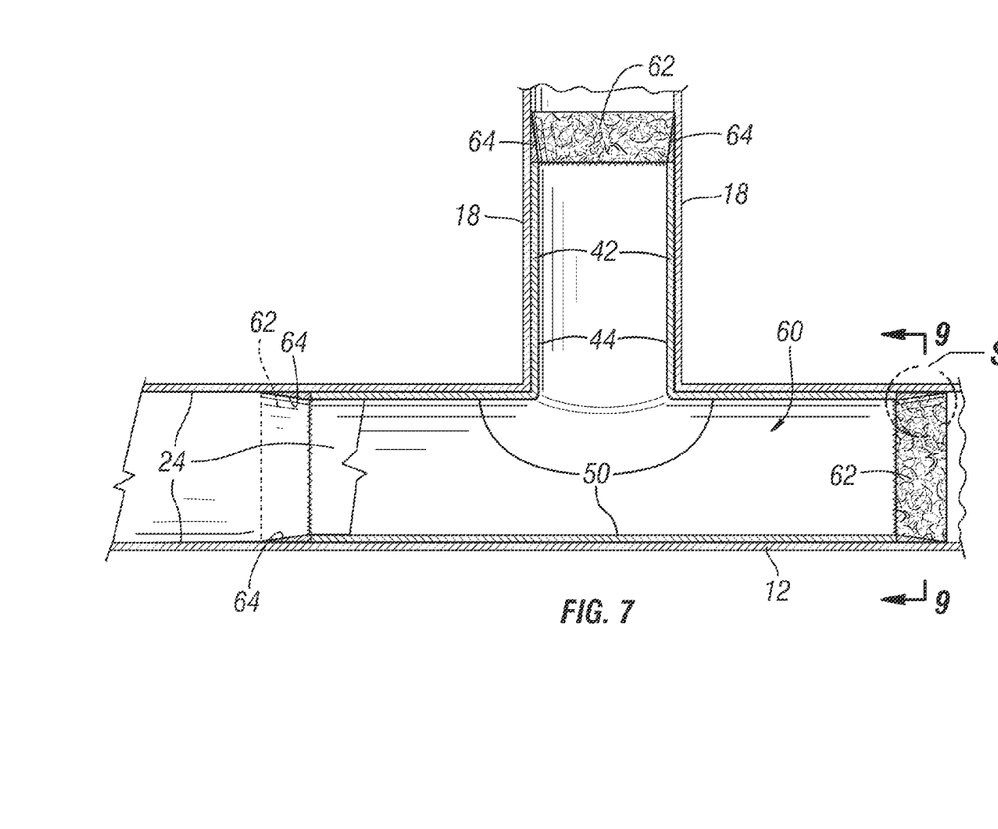
FIG. 7 is a cut-away view of the sheet liner assembly of FIG. 5 formed inside a pipe junction of sewer lines.
Figure 8:
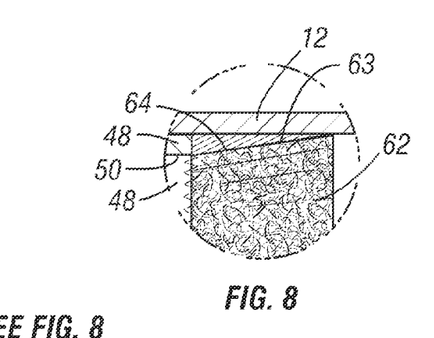
FIG. 8 is an enlarged view of a portion of FIG. 7.
Figure 9:
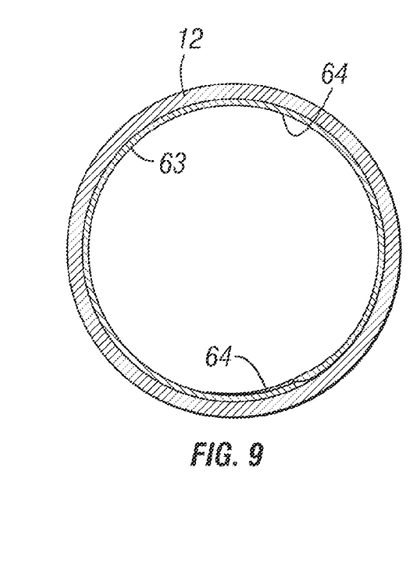
FIG. 9 is an end view of FIG. 7.

The flat sheet liner 48 is designed to fold around onto itself, creating a tube which fits within the pipe 10, 12, 18 which is to be repaired. This is best shown in FIG. 6. Any process or system (such as pulled into place or inversion processes described above) can be used for inserting the liner assembly 60 into the pipe 10, 12, 18 which is to be repaired. Holes 66 may be included in the liner assembly 60 to help an installer install the liner 60 into the pipe 10, 12 18 using the pulled into place method.

The liner assembly 60 is cured in place in the pipe 10, 12, 18 using a curable resin which cures while a bladder tube 24 is expanded inside the liner assembly 60 in the pipe 10, 12, 18. Once the resin cures, the bladder tube 24 can be removed leaving the liner assembly 60 formed in the shape of the inside of the pipe 10, 12, 18.

Since the transition collar or compressible material 62 is easily compressible, the compressible material 62 is cured in the shape of a taper 64 from the inside of the liner 60 down to the inside edge of the pipe 10, 12, 18. This taper 64 acts as a ramp allowing solids to pass right through the liner 60 without getting hung up on edges or ridges 39. Thereby, the present invention pipe lining is much less prone to creating a future blockage within the pipe 10, 12, 18.

Figure 10:
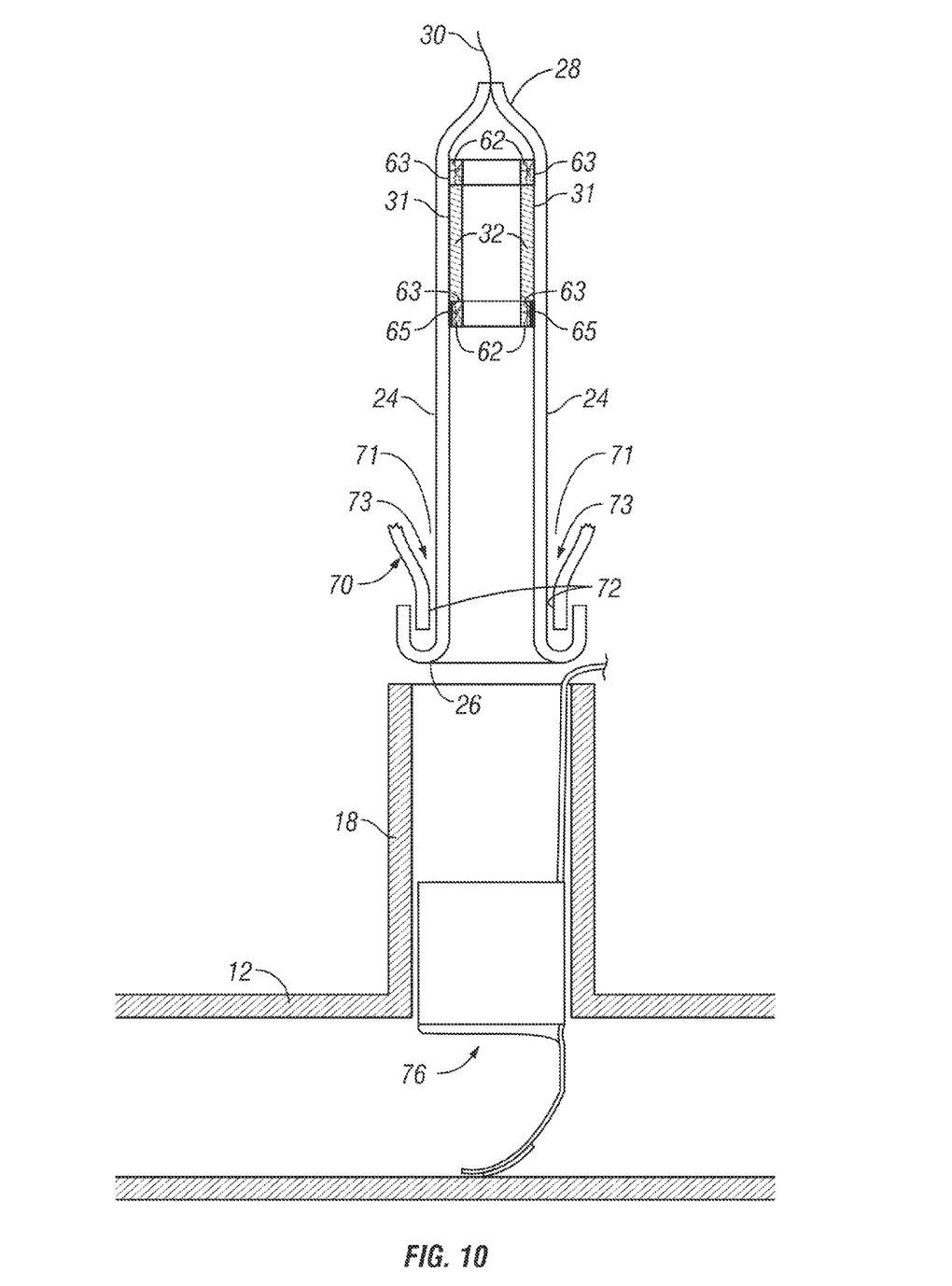
FIG. 10 is a cutaway view of one embodiment of a partial liner of the present invention before being inserted into a sewer line.

FIGS. 10 and 11 show an embodiment of the present invention using a tubular liner 32 for lining straight pipe sections using an inversion process for installing the bladder 32 inside a pipe 10, 12, 18 as described above. Similar to the new liner assembly 60, the tube liner 32 of the present invention has transition collar or compressible material 62 attached to edges or ends of the tube liner 32. Here again, the compressible material 62 on the liner tube 32 forms a taper 64 for reducing chances of buildup or blockage inside the pipes 10, 12, 18.

Preferably the compressible material 62 has a thin polymer or other type of coating 63 of polyurethane, polyvinyl chloride, or the like. A frangible attachment 65 may be used to hold the liner tube 32 to the bladder tube 24. The frangible attachment 65 can be accomplished with a solvent that chemically bonds the coating on the compressible material 63 to the bladder 24. It is preferred that the coating 63 on these short sections of compressible material 62 be used to make the frangible connection 65 by solvent welding the coating 63 to the bladder 24. The frangible attachment 65 allows the bladder 24 to pull the liner 32 into place in the pipe 10, 12, 18 as the bladder 24 is inverted into the pipe. Then, the coating 63 can break away from the compressible material 62 when the bladder 24 is removed after the resin cures. This works very well because essentially the entire 360 degrees of the compressible material 62 (via the coating 63) is bonded to the bladder 24. When the liner 32 is being inverted into the pipe, the pull inverting the liner 32 is a straight flat pull so the connection between the bladder 24 and the compressible material 62 via the coating 63 is strong. This is like pulling a banana peel straight, not peeling it. It is very difficult to pull apart. However, when the bladder 24 is removed via the pull line 30. The bladder 24 is re-inverted out of the pipe 10, 12, 18 causing the bladder 24 to be peeled away from the liner 32 and the thin coating 63 is easily peeled off and away from the compressible material 62. This is like peeling the banana peel and the coating 63 easily peels away from the compressible material 62 as the bladder 24 is removed.

The liner of the present invention can be a tubular liner, such as a tube sock, or can form a tube from a flat sheet, such as 48. In addition, the liner does not need to form a tube and can simply cover a portion of the inner circumference of the pipe. Furthermore, the transition collar or compressible material 62 does not need to extend around the entire circumference of the pipe.

As mentioned above, any system or method for getting the new liner assembly 32, 60 into place within the pipe 10, 12, 18 and curing the liner assembly 32, 60 in place can be used. For example, but not limited to, the systems and methods used in U.S. Pat. Nos. 5,855,729; 5,964,249; and 6,039,079 to the inventor of the present invention, and U.S. application Ser. No. 11/359,026, also to the inventor of the present application, can all be used and are herein incorporated by reference in their entirety.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved liner assembly for lining pipe comprising:
a flexible pipe liner constructed of resin absorbent material and including a resin impermeable coating on one side; and
a transition collar of a more compressible resin absorbent material than the liner and including a coating on one side being separate from but securely attached to and extending at least partially from an end of the liner for forming a taper from an inside surface of the pipe to an inside surface of the liner when the liner and collar are compressed against the pipe, the taper reduces ridges along the end of the liner and thus reduces build-up of solids at the end of the liner.

2. The liner assembly of claim 1 wherein the flexible pipe liner is constructed from a felt material or fiberglass.

3. The liner assembly of claim 1 wherein the transition collar is more compressible than the flexible pipe liner.

4. The liner assembly of claim 1 wherein the transition collar is constructed from stitch bond material, knit material, or foam.

5. The liner assembly of claim 1 wherein the coating is a polymer.

6. The liner assembly of claim 1 wherein the coating is peelably releasable from the collar.

7. The liner assembly of claim 1 wherein the coating is not water permeable.

8. The liner assembly of claim 1 wherein the flexible pipe liner is a tube or forms a tube to conform to an inner circumference of the pipe when located in the pipe.

9. The liner assembly of claim 8 wherein the tube is formed from a flat sheet liner.

10. The liner assembly of claim 9 further comprising a transition material extending from a longitudinal edge of the flat sheet liner for forming a taper to the longitudinal edge as the flat sheet liner is wrapped around itself to form the tube.

11. The liner assembly of claim 9 wherein the transition collar extends around an end of the tube or formed tube to form the taper around the inner circumference of the pipe to an inner circumference of the liner.

12. The liner assembly of claim 11 wherein the transition collar extends around the entire periphery of the end of the liner.

13. The liner assembly of claim 1 further comprising a positioning device operatively connected to the liner assembly for positioning the liner assembly within the pipe.

14. The liner assembly of claim 13 wherein the positioning device is an inflatable bladder.

15. The liner assembly of claim 13 wherein the positioning device is frangibly connected to the liner assembly.

16. The liner assembly of claim 13 wherein the positioning device is frangibly connected to the transition collar.

17. The liner assembly of claim 13 wherein the positioning device is frangibly connected to the liner assembly by a solvent weld.

18. The liner assembly of claim 13 wherein the positioning device is connected to a coating on the liner or the transition collar.

19. A method of lining a section of a pipe comprising:
providing a liner formed from a resin absorbent material and having a resin impermeable coating on one side, the liner having a transition collar being resin absorbent and having more compressibility than the liner, the transition collar separate from and securely attached to and extending from an end of the liner for forming a taper from an inside surface of the pipe to an inside surface of the liner when the liner is cured in place in the pipe using a curable resin;
applying the curable resin to the liner;
inserting the liner into the pipe;
forming the liner inside the pipe; and
allowing the resin to cure, thereby lining the section of the pipe.

20. The method of claim 19 wherein the step of inserting the liner into the pipe is by a pulled-in place process.

21. The method of claim 19 wherein the step of inserting the liner into the pipe is by an inversion process.

22. The method of claim 19 further comprising operatively attaching the liner or the transition collar to an inflatable bladder for inserting the liner into the pipe.

23. The method of claim 22 wherein the step of attaching the liner or the transition collar to an inflatable bladder is by creating a frangible connection between the liner or the transition collar and the bladder.

24. The method of claim 23 wherein the frangible connection is created by solvent welding the bladder to a coating on the liner or the transition collar.

25. The method of claim 24 further comprising detaching the bladder from the liner or the transition collar after the resin has cured by peeling the coating away from the liner or the transition collar.

26. An improved pipe liner comprising:
a flexible, resin absorbent body for forming to an inside surface of a pipe and curing-in place when resin absorbed into the body cures, the body including an opening therein;
a lateral liner of resin absorbent material extending from the opening in the body for repairing a junction of two pipes; and
a flexible, resin absorbent transition collar, which is more compressible than the body, is attached to an edge of the body for creating a taper from an inside surface of the pipe to the edge of the liner when the liner and collar are located inside the pipe.

27. The pipe liner of claim 26 wherein the transition collar is foam, stitch bond, or soft knit material.

28. The pipe liner of claim 26 wherein the body forms a tube.

29. The pipe liner of claim 26 wherein the body is fiberglass or felt.

30. The pipe liner of claim 26 further comprising a coating on one side of the body and/or one side of the transition collar.

31. A pipe liner for lining a pipe, comprising:
a sheet of flexible resin absorbent material capable of bending around onto itself and forming a tube;
a transition material extending from a longitudinal edge of the sheet material for forming a taper to the longitudinal edge inside the formed tube as the sheet liner is formed into the tube, thereby having the transition material approximately parallel with the pipe; and
a curable resin absorbed into the liner for curing the liner in place inside the pipe.

32. The pipe liner of claim 31 wherein the transition material is stitch-bond material or foam.

33. The pipe liner of claim 31 further comprising a transition collar, extending from a radial edge of the sheet material for forming a taper from the pipe to the radial edge of the formed tube.

34. The pipe liner of claim 33 wherein the transition collar is stitch-bond material or foam.

35. A method of lining pipe comprising:
providing a flexible sheet liner formed from a resin absorbent material, the sheet liner capable of bending around onto itself and forming a tube, the sheet liner further having a transition material, which is different from the sheet liner and more compressible than the sheet liner, extending from an edge of the sheet liner for forming a taper along an edge of the sheet liner when the liner is cured in place in the pipe using a curable resin and an expandable bladder to shape the liner inside the pipe, the taper for reducing restrictions along the edge of the sheet liner inside the pipe;
applying the curable resin to the flexible sheet liner and the transition material;
inserting the liner into the pipe;
forming the liner inside the pipe by expanding the bladder inside the liner; and
allowing the resin to cure.

* * * * *